United States Patent

[11] 3,617,519

[72] Inventor John C. Hayes
 Palatine, Ill.
[21] Appl. No. 795,082
[22] Filed Jan. 29, 1969
[45] Patented Nov. 2, 1971
[73] Assignee Universal Oil Products Company
 Des Plaines, Ill.

[54] CONTROLLED SULFUR CONTENT IN PLATINUM-RHENIUM REFORMING
 10 Claims, No Drawings

[52] U.S. Cl..................................................... 208/139,
 208/138
[51] Int. Cl........................................................ C10g 35/08
[50] Field of Search............................................ 208/138,
 139

[56] References Cited
 UNITED STATES PATENTS
 2,952,611 9/1960 Haxton et al. ................ 208/138
 3,415,737 12/1968 Kluksdahl..................... 208/138
 3,434,960 3/1969 Jacobson et al. ............. 208/138

OTHER REFERENCES

Blom et al. " Hydrocarbon Processing and Petroleum Refiner" Vol. 42 10, pages 132– 134 (1965)

*Primary Examiner*—Herbert Levine
*Attorneys*—James R. Hoatson, Jr. and Thomas K. McBride ABSTRACT: A process for reforming a gasoline fraction, wherein a mixture of the gasoline fraction, hydrogen, sulfur or a sulfur-containing compound, is continuously contacted in a substantially water-free zone, with a reforming catalyst at conditions selected to produce a high-octane reformate and wherein the reforming catalyst comprises a combination of a platinum group component, a rhenium component, a halogen component, and a sulfur component with an alumina carrier material is improved by selecting the amount of sulfur or sulfur-containing compound continuously entering the reforming zone as a direct function of the atomic ratio of the platinum group metal to the rhenium metal contained in the catalyst. Key feature of the improved process involves the continuous use of sulfur in a range which is determined primary by reference to the atomic ratio of the platinum group metal to rhenium contained in the catalyst.

CONTROLLED SULFUR CONTENT IN PLATINUM-RHENIUM REFORMING

The subject of the present invention is an improvement in a catalytic reforming process wherein a low-octane hydrocarbon fraction boiling in the gasoline range is converted while in contact with a catalytic composite containing a platinum group component and a rhenium component, into high yields of an aromatic-rich reformate. More precisely, the present invention pertains to the controlled use of a sulfur additive in a reforming process using a catalytic composite having both a platinum group component and a rhenium component combined therewith. The present invention is based upon my finding that this type of reforming process can be substantially improved by continuously utilizing a controlled amount of sulfur in the reaction environment where the critical feature involves the selection of the amount of sulfur used as a function of the atomic ratio of the platinum group metal to the rhenium metal contained in the catalyst. In other words, I have determined that a reforming process using this type of catalyst can be substantially improved by using a sulfur additive in an amount which is selected on the basis of this atomic ratio.

The conception of the present invention was a product of a number of recent developments associated with the art of continuous catalytic reforming processes. First, it was determined that the use of a catalytic composite containing a platinum metal component and a rhenium component combined with an alumina carrier material enabled significant improvements in the performance of the resulting process in the areas of yield of $C_5$ pulse reformate, increased hydrogen production, and improved stability characteristics. Coupled with the development of this catalyst was the recognition of the detrimental effects of small amounts of water on the performance of a reforming process using this catalyst. Accompanying these developments was an extensive controversy regarding the response of this type of catalyst to the presence of sulfur in the reaction environment. As is well known to those skilled in the art, it is the traditional teaching, backed by extensive experimental and commercial work, that sulfur is to be avoided in a reforming process using a platinum group component-containing catalyst. Indeed, the clear teaching of the prior art regarding reforming processes using a platinum metal catalyst is to the effect that the presence of sulfur is to be avoided at all costs. In fact, as I have recently disclosed, it is only under very unusual and restrictive conditions that the presence of sulfur in a reforming process using a platinum metal-containing catalyst can be beneficial. Heretofore, it has been determined for this platinum-rhenium catalyst that the presence of sulfur in a substantially water-free reaction environment will have several beneficial effects; namely, increased stability and decreased carbon make. I have now further refined this concept of using sulfur with this catalyst, and have discovered that a reforming process using a catalyst having an atomic ratio of platinum group metal to metal to rhenium metal of at least 1:1, can be substantially and consistently further improved in performance by selecting the specific amount of sulfur entering the reforming zone during the course of the process as a direct function of the atomic ratio of the platinum group metal to the rhenium metal contained in the catalyst used. In brief, I have observed that these platinum-rhenium catalysts are extremely ambivalent or inconsistent in their response to the presence of sulfur in the reaction environment: in some cases, sulfur markedly improves the performance of the reforming process, and in other cases using catalysts of slightly different composition, the degree of improvement is not of the same order. In order to understand this lack of uniformity of response to sulfur for reforming catalysts having varying amounts of rhenium and platinum, I have conducted an extensive investigation as a result of which I have concluded that the principal factor governing the response of the catalyst to sulfur is the atomic ratio of platinum group metal to rhenium contained therein. Specifically, I have determined that a catalyst having an atomic ratio of platinum group metal to rhenium of about 1:1 to 2:1 is acutely sensitive to sulfur, and it is only within a relatively narrow small range that maximum benefits of sulfur addition are achieved. On the other hand, I have found that as this atomic ratio increases above 2:1 the resulting catalysts are much less sensitive to sulfur, and, accordingly, good results are obtained with a much broader and higher range of sulfur as will be explained hereinafter.

It is well known in the art that the requirements for an optimum process for transforming low-octane charge stocks into high-octane product stocks, at minimum loss to undesired products, involves a dual-function catalyst, a reaction environment, and process conditions, designed to promote octane-upgrading reactions for paraffins and naphthenes. Paraffins are undoubtedly the component of gasolines that have the highest octane-improving potential, since many of the straight-chain paraffins are in the 0–50 range of the octane scale. For paraffins, the upgrading reactions are: isomerization of the relatively straight-chain paraffins to more highly branched paraffins, dehydrogenation to olefins, dehydrocyclization to aromatics, and selective hydrocracking to lower molecular weight, more highly branched paraffins. Of these, the dehydrocyclization reaction is the one yielding the maximum gain in octane number, and is consequently preferred. Since this dehydrocyclization reaction releases 4 moles of hydrogen, it is obviously favored by low hydrogen partial pressure and by low total system pressure.

Naphthenes, on the other hand, are not as potentially productive of octane increase as are paraffins, since the clear research octane number of most naphthenes is in the range of 65–80. Nevertheless, they are a substantial source of octane improvement via the upgrading reactions of dehydrogenation to aromatics, ring isomerization, etc. Since 1 mole of naphthene will typically produce 1 mole of aromatics and 3 moles of hydrogen, these reactions are similarly favored by low hydrogen partial pressure and by low total system pressure.

Besides these upgrading reactions, it is clear that a substantial number of other reactions are simultaneously proceeding, to some extent, in a typical reforming operation. These, as is true with any complex set of reaction mechanisms, are injected into the overall picture by the uncontrollable side phenomena that are produced by a myriad of factors that color and complicate the actual operation of a real process. Examples of these side reactions are: demethylation and dealkylation of alkylaromatics and alkylnaphthenes; ring opening of naphthenes, excessive hydrocracking of aliphatics to light gases; thermal cracking of nonaromatic hydrocarbons; dehydrogenation and condensation of aromatics to form polynuclear aromatics which are carbonaceous deposit precursors; acid-catalyzed polymerization and alkylation with olefins and other highly reactive components to yield high molecular weight products which, after further dehydrogenation, can contribute to the carbonization of the catalyst, etc. For purposes of discussion here, these side reactions are conveniently divided into those that are associative such as condensation, polymerization, etc., and those that are dissociative such as cracking and hydrocracking. The associative reactions are generally the chief culprits in the observed principal mechanisms of catalyst deactivation in reforming: the formation of carbonaceous deposits on the catalyst. It is clear that these association reactions are generally net producers of hydrogen and are consequently, promoted by low hydrogen partial pressure and low system pressure. On the other hand, it is evident that the dissociation reactions generally consume hydrogen and are promoted by high hydrogen partial pressure.

Extensive studies have shown that in order to accelerate these upgrading reactions while simultaneously holding the side reactions reasonably in check, a dual-function catalyst containing a hydrogenation-dehydrogenation function and an acid-acting function is necessary. In fact, a catalyst containing a platinum metal component combined with an acid-acting support has achieved a dominant position in this art. Recently, there has been developed a markedly superior dual function catalyst which, in addition to the platinum metal component, contains a rhenium component, both of which are combined with an alumina carrier material. It has been previously determined that, when this superior catalyst is used in a reforming process in conjunction with the controlled addition of sulfur or a sulfur-containing compound to the reforming zone coupled with the substantial exclusion of water therefrom, the performance of the resulting process could be improved relative to that heretofore experienced with conventional reforming catalysts. In fact, it had been observed that the presence of sulfur in a reforming process using this type of catalyst could increase stability, and $C_5+$ yield, and could decrease carbon make. In my investigation of this sulfur phenomenon for various catalysts containing different proportions of platinum and rhenium at various concentration levels, I have observed that the benefits of sulfur on a reforming process using this type of catalyst flucuated over a relatively wide range; that is, the sulfur effect appeared to be somewhat inconsistent. As a result of these investigations, I have now determined that the maximum benefits of sulfur addition on the performance of a reforming process using this catalyst are obtained when the amount of sulfur utilized is selected on the basis of the atomic ratio of the platinum group metal to the rhenium metal contained in the catalyst used. More particularly, I have concluded that the principal factor governing the response of this catalyst to sulfur is this atomic ratio and that catalysts having an atomic ratio of platinum group metal to rhenium of about 1:1 to about 2:1 are acutely sensitive to sulfur, and it is only within a relatively narrow range of sulfur that maximum benefits of sulfur addition are achieved. In contrast with this situation for these last catalysts, I have determined that as this atomic ratio increases above about 2:1, the resulting catalysts are much less sensitive to sulfur and the area of beneficial operation in regard to the exact amount of sulfur utilized is much broader. The principal advantages associated with selecting the amount of sulfur to be used in a reforming process as a function of this atomic ratio are: increased $C_5+$ yield, decreased methane make, increased temperature and yield stability, increased hydrogen purity, and lower rate of carbon deposition.

It is, accordingly, an object of the present invention to provide improvements in a continuous reforming system using continuous sulfur addition coupled with a catalyst having an atomic ratio of platinum group metal to rhenium of at least 1:1. A more specific object is to increase the stability of a continuous reforming process using this type catalyst. A third object is to provide a method for selecting the amount of sulfur to be used in a reforming process which employs platinum-rhenium catalyst so that maximum benefit of the use of sulfur is consistently obtained.

In brief summary, my invention involves an improvement in a reforming process wherein a mixture of a gasoline fraction, hydrogen and sulfur or a sulfur-containing compound is continuously contacted with a recently developed reforming catalyst at conditions selected to produce a high-octane reformate. The recently developed reforming catalyst employed comprises a combination of a platinum group component, a rhenium component, a halogen component, and a sulfur component with an alumina carrier material. The platinum group component and the rhenium component are present in amount sufficient to result in the final catalyst having an atomic ratio of platinum group metal to rhenium of at least 1:1 and containing, on an elemental basis, about 0.1 to about 2.0 total wt. percent of the platinum group metal and the rhenium metal. Furthermore, in this process the sulfur or sulfur-containing compound is introduced into the reforming zone not only during startup of the process but also continuously thereafter. For a process of this type, my improvement involves selecting the amount of sulfur or a sulfur-containing compound continuously entering the reforming zone as a function of the atomic ratio of the platinum group metal to the rhenium metal contained in the catalyst. More specifically, the function is expressed by the following relationships in which the amount of sulfur continuously entering the reforming zone is calculated as an equivalent amount of weight p.p.m. of elemental sulfur in the gasoline fraction: (1) for an atomic ratio of about 1:1 to about 2:1, an amount of sulfur of about 10 to about 100 p.p.m.; (2) for an atomic ratio greater than about 2:1 to about 4:1 an amount of sulfur of about 25 to 1,000 p.p.m.; and, (3) for an atomic ratio greater than about 4:1 an amount of sulfur of about 50 to about 3,000 p.p.m.

Other objects and embodiments of the present invention relate to details about: the charge stocks that are processed therein, the sulfur additives that are preferably utilized to achieve the desired amounts of sulfur, the reforming catalyst structure and composition employed, the mechanisms of injecting and maintaining the sulfur levels therein, and the like particulars. These will appear hereinafter in the detailed explanation of each of these facets of the present invention.

Before considering in detail the various ramifications of the present invention, it is convenient to define several of the terms, phrases, and expressions used in the specification and in the appended claims. The phrase "gasoline fraction" is intended to refer to a portion of a petroleum crude oil, of a mixture of synthesized hydrocarbons, of a coal tar distillate, of a shale oil, etc., that boils anywhere within the gasoline temperature range of about 50° to about 400° F. and typically has a gravity on the API scale at 60° F. of 50 to 70. The expression "sulfur entering the reforming zone" is to be construed to mean the total quantity of equivalent sulfur entering the reforming zone by any means as elemental sulfur or in sulfur-containing compounds. The amounts of sulfur given herein are calculated as weight parts of equivalent sulfur per million weight parts of the gasoline fraction. The expression "substantially free from water" refers to the situation where the total water and water-producing substances entering the reforming zone from any source is less than 25 wt. p.p.m. based on the gasoline fraction calculated as equivalent weight of water. The term "activity" when it is applied to reforming operations refer to the ability of the process to produce, at a specified severity level, a $C_5+$ reformate product of the required quality as measured by octane number. The term "stability" when it is applied to the reforming process refers to the rate of change with time of the operating parameters associated with the process; for instance, a common measure of stability is the rate of change of reactor temperature that is required to maintain a given octane number in output product—the smaller slope implying the more stable process. The "liquid hourly space velocity" is defined to be the equivalent liquid volume of the charge stock flowing over the bed of catalyst per hour divided by the volume of the catalyst bed.

The charge stocks that can be reformed in accordance with the process of the present invention comprise gasoline fractions containing naphthenes and paraffins. The preferred charge stocks are those consisting essentially of naphthenes and paraffins although in some cases aromatics and/or olefins are also present. The preferred class includes straight run gasolines, natural gasolines, synthetic gasolines and the like. On the other hand, it is frequently advantageous to charge thermally or catalytically cracked gasolines or higher boiling fractions thereof to the reforming process of the present invention. Mixtures of straight run and cracked gasoline can also be used. The gasoline charge stock may be full boiling range gasoline having an initial boiling point of from about 50° F. to about 100° F. and an end boiling point within the range of from about 325° to 425° F., or may be a selected fraction thereof which usually will be a higher boiling fraction commonly referred to as a heavy naphtha; for example, a preferred charge stock is a naphtha boiling in the range of $C_7$ to $C_{11}$. It is also within the scope of the present invention to charge pure hydrocarbons or mixtures of hydrocarbons, usually paraffins or naphthenes, which boil in the gasoline boiling range and are to be converted to aromatics.

The charge stock for the process of the present invention must be carefully controlled in the areas of concentration of sulfur-containing compounds and of oxygen-containing compounds. In general, it is preferred that the concentration of both of these constituents be reduced to low levels by any suitable pretreating means such as mild hydrogenation treatment (called in the art "hydrorefining," "hydrotreating," "hydrodesurization," etc. with a suitable supported cobalt and/or molybdenum catalyst. This is not to be construed to exclude the possibility that the concentration of sulfur-containing compounds in the charge stock could be carefully adjusted in order to furnish the required amount of sulfur to the reforming zone; but this latter method is difficult to control and is, consequently, not preferred. In any event, it is necessary that the total concentration of water and of water-yielding substances in the charge stock be reduced to at least 25 p.p.m. calculated as equivalent water and preferably less than 10 p.p.m. These restrictions are doubly significant in one embodiment of the present invention, in which the hydrogen gas contained in the effluent from the reforming zone is separated therefrom and at least a portion of the separated hydrogen gas is recycled to the reforming zone without further treatment because the available water and hydrogen sulfide will also be recycled with this hydrogen-rich gas. Accordingly, the concentration of these constituents will tend to build up to an equilibrium level in this recycle stream and small amounts of these materials in the input stream may, if the process is not carefully controlled, build up to substantial undesired levels in the recycle stream.

Accordingly, it is preferred to first reduce the sulfur and oxygen concentration of the charge stock to very low levels, such as 5 wt. p.p.m. or less respectively, and thereafter inject a controlled amount of sulfur or a sulfur-containing compound into the reforming zone in any suitable manner. Any reducible sulfur-containing compound, that does not contain oxygen, which is converted to hydrogen sulfide by reaction with hydrogen at the conditions in the reforming zone may be used. This class includes: aliphatic mercaptans such as ethyl mercaptan, propyl mercaptans, tertiary butyl mercaptans, etc.; aromatic mercaptans such as thiophenol and derivatives; naphthenic mercaptans such as cyclohexyl mercaptan; aliphatic sulfides such as ethylsulfide; aromatic sulfides such as phenyl sulfide; aliphatic disulfides such as tertiary butyl disulfides; aromatic disulfides such a phenyldisulfide; dithioacids; thioaldehydes; thioketones, heterocyclic sulfur compounds such as the thiophenes and thiophanes; and the like compounds. In addition, free sulfur or hydrogen sulfide may be used if desired. Usually, a mercaptan such as tertiary butyl mercaptan or heptyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

The amount of sulfur entering the reforming zone at any given time is a function of residual sulfur in the charge stock, the amount of sulfur added to and present in the hydrogen stream, the amount of sulfur added to the charge stock, and any amount added directly to the reforming zone. Regardless of the source of the sulfur entering the reforming zone, it is an essential feature of the present invention that the total from all sources must be continuously maintained in a range which is determined by the atomic ratio of the platinum group metal to rhenium metal contained in the catalyst utilized. More specifically, the amount of sulfur continuously entering the reforming zone, expressed as an equivalent amount of weight p.p.m. of elemental sulfur in the gasoline fraction, must in accordance with the present invention be obtained from the following relationships: (1) for an atomic ratio of about 1:1 to about 2:1, the amount of sulfur is selected from the range of about 10 to about 100 p.p.m.; (2) for an atomic ratio greater than 2:1 to about 4:1, an amount of sulfur selected from the range of about 25 to 1,000 p.p.m. gives excellent results; and (3) for an atomic ratio greater than 4:1 an amount of sulfur selected from the range of about 50 to 3,000 wt. p.p.m. is extremely beneficial.

It is, of course, understood that once the range of sulfur to be utilized continuously during the reforming process is selected by means of the relationships given above, the final selection of the specific value to be utilized within the range selected is a function primarily of the exact characteristics of the charge stock utilized, the severity level maintained within the reforming zone, and the total amount of platinum group metal and rhenium metal utilized in the catalyst. This last factor is extremely significant, and from my investigations I have concluded that, in general, relatively lower amounts of sulfur are most beneficially utilized with the catalysts having the smaller amounts of total metal content. On the other hand, I have observed that for catalysts possessing a relatively high total metals content that superior results are obtained with relatively large amounts of sulfur within the range limitations previously disclosed.

Once the amount of sulfur to be used with the particular catalyst is determined by the procedure outlined above, the reforming process must be operated in a manner which allows the benefits of sulfur addition to be obtained. More specifically, I have determined that it is essential that sulfur be used both during startup of the process and continuously thereafter. If the process is first lined out and sulfur then added the benefits of sulfur addition will not be obtained. Likewise, if sulfur is added for a first period, then stopped and the process run until it is substantially free of sulfur, the process will not respond positively to the reintroduction of sulfur.

As indicated above, the reforming catalyst utilized in the present invention comprises an alumina carrier material (or alumina support) having combined therewith a platinum group component, a rhenium component, a sulfur component, and a halogen component. Considering first the alumina carrier material, it is preferred that it be a porous, adsorptive, high surface area support having a surface area of about 25 to 500 or more m.$^2$/g. Suitable alumina materials are the crystalline aluminas known as gamma-, eta-, and theta-alumina, with gamma-alumina giving best results. In addition, in some embodiments the alumina carrier material may contain minor proportions of other well known refractory inorganic oxides such a silica, zirconia, magnesia, etc. However, the preferred support is substantially pure gamma- or eta-alumina. In fact, an especially preferred carrier material has an apparent bulk density of about 0.30 to about 0.70 g./cc. and has surface area characteristics such that the average pore diameter is about 20 to about 300 Angstroms, the pore volume is about 0.10 to about 1.0 ml./g. and the surface area is about 100 to about 500 m.$^2$/g. A preferred method for manufacturing this alumina carrier material is given in U.S. Pat. No. 2,620,314.

Another essential constituent of the reforming catalyst used in the present invention is a halogen component. Although the precise form of the chemistry of the association of the halogen component with alumina carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the alumina support in any suitable manner, either before, during, or after the addition of the other components. For example, the halogen may be added as an aqueous solution of an acid such as hydrogen fluoride, hydrogen chlorine, hydrogen bromide, etc. In addition, the halogen or a portion thereof may be composited with the alumina during the impregnation of the latter with the platinum group component; for example, through the utilization of a mixture of chloro-platinic acid and hydrogen chloride. In another situation, the alumina hydrosol which is typically utilized to form the alumina carrier material may contribute at least a portion of the halogen component to the final composite. In any event, the halogen will be typically composited in such a manner as to result in a final composite containing about 0.1 to about 1.5 wt. percent, and preferably about 0.4 to about 0.9 wt. percent of halogen calculated on an elemental basis.

As indicated above, the reforming catalyst, also contains a platinum group metallic component. Although the process of the present invention is specifically directed to the use of a catalytic composite containing platinum or a compound of platinum, it is intended to include other platinum group metals such as palladium, rhodium, ruthenium, osmium, etc. The platinum group metallic component, such as platinum may exist within the final catalytic composite as a compound such as an oxide, sulfide, halide, etc., or in an elemental state. Generally, the amount of the platinum group metallic component present in the final catalyst is small compared to the quantities of the other components combined therewith. In fact, the platinum group metallic component generally comprises about 0.5 to about 1.0 wt. percent of the final catalyst calculated on an elemental basis. Excellent results are obtained when the catalyst contains about 0.1 to about 0.9 wt. percent of the platinum group metal.

The platinum group metallic component may be incorporated in the catalytic composite in any suitable manner such as coprecipitation or cogellation with the alumina support, ion exchange with the alumina support and/or alumina hydrogel, or impregnation of the alumina support at any stage in its preparation either before, during, or after its calcination treatment. The preferred method of preparing the catalyst involves the utilization of water-soluble compounds of the platinum group metals to impregnate the alumina support. Thus, the platinum group metal may be added to the alumina support by commingling the latter with an aqueous solution of chloroplatinic acid. Following the platinum impregnation, the impregnated carrier is typically dried and subjected to a conventional high temperature calcination or oxidation technique.

Another essential constituent of the catalyst used in the present invention is the rhenium component. This component may such present as an elemental metal, as a chemical compound, such as the oxide, sulfide, halide, or in physical association with the alumina support and/or the other components of the catalyst. Generally, the rhenium component is utilized in an amount sufficient to result in a final catalytic composite containing about 0.05 to about 1.0 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the alumina support. The impregnation solution can comprise an aqueous solution of a suitable rhenium salt such as ammonium perrhenate, sodium perrhenate, rhenium chloride, etc. However, best results are obtained with perrhenic acid. The rhenium component can be impregnated either prior to, simultaneously with, or after the platinum group metallic component is added to the support. In general, best results are achieved when the rhenium component is impregnated simultaneously with the platinum group metallic component. In fact, a preferred procedure involves using an impregnation solution containing perrhenic acid, chloroplatinic acid and hydrogen chloride.

As was pointed out hereinbefore, the catalytic composites of interest for the present invention have an atomic ratio of platinum group metal to rhenium metal of at least 1:1. Additionally, I have determined that a highly significant parameter governing effectiveness of these catalysts for my purposes is the so-called "total metal content". This is defined to be the total wt. percent of the platinum group metal plus the rhenium metal contained in the catalyst. Included within the scope of the present invention, are catalytic composites having a total metal content of 0.1 to about 2.0 wt. percent. Accordingly, my findings regarding the significance of the atomic ratio of platinum group metal to rhenium on the response of the catalyst to sulfur only have relevance for catalysts meeting this total metal content limitation. Accordingly, examples of especially preferred catalytic composites are composites containing: 0.1 wt. percent Re + 0.65 wt. percent Pt, 0.2 wt. percent Re + 0.2 wt. % Pt, 0.1 wt. % Re + 0.1 wt. % Pt, 0.2 wt. % Re + 0.55 wt. % Pt, 0.375 wt. % Re + 0.375 wt. % Pt, 0.2 wt. % Re + 0.375 wt. % Pt, and 0.1 Re + 0.3 Pt.

Regardless of the details of how the components of the catalyst are composited with the alumina carrier, the final catalyst generally will be dried at a temperature of from about 200° to about 600° F. for a period of from about 0.5 to 4 hours or more and finally oxidized in an air stream at a temperature of about 800° to about 1,100° F. for a period of about 0.5 to 10 hours or more. In most cases, it is advantageous to adjust the concentration of the halogen component in the catalyst during this oxidation step by injecting into the air stream used therein, an aqueous solution of a suitable halogen-containing compound.

Thereafter, it is preferred that the resultant catalytic composite be subjected to a substantially water-free reduction step. This step is designed to insure a uniform and finely divided dispersion of the metallic components throughout the alumina support. Preferably, substantially pure and dry hydrogen is used as the reducing agent in this step. The reducing agent is preferably contacted with the oxidized catalyst at a temperature of about 1,000° to 1,100° F., a gas hourly space velocity of about 700 hr.[11] and for a period of about 1 to about 10 hours effective to reduce both metallic components to their elemental state.

The final step in preparation of the catalytic composite involves subjecting the reduced catalyst to a presulfiding operation designed to incorporate in the catalytic composite from about 0.05 to about 0.5 wt. percent sulfur calculated on an elemental basis and especially about 0.10 wt. percent. Preferably, this presulfiding treatment takes place in the presence of hydrogen and a suitable sulfur-containing compound such as hydrogen sulfide. Typically, this step comprises treating the reduced catalyst with a sulfiding gas such as a mixture of hydrogen and hydrogen sulfide having about 10 moles of hydrogen per mole of hydrogen sulfide at a temperature sufficient to effect the desired incorporation of sulfur, generally ranging from about 100° to 1,100° F. or more.

According to the present invention, the gasoline fraction, hydrogen, and sulfur or a sulfur-containing compound are contacted with the catalyst in a reforming zone. This contacting may be accomplished in a fixed bed system, a moving bed system, a fluidized system, or in a batch-type operation; however, in view of the danger of the attrition losses of the valuable catalyst and of well known operational advantages, it is preferred to use a fixed bed system. In this system, a hydrogen-rich gas and the charge stock are preheated, by any suitable heating means, to the desired reaction temperature and then are passed in admixture with sulfur or a sulfur-containing compound, into a reforming zone containing a fixed bed of the catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

It is an essential feature of the present invention that the reforming zone is maintained substantially water-free. To achieve this condition, it is necessary to control the water level present in the charge stock and the hydrogen stream which are being charged to the reforming zone. It is essential that the equivalent water entering the reforming zone from all sources be held to a level less than that equal to 25 wt. p.p.m. of the charge stock and preferably less than 10 p.p.m. In general, this can be accomplished by drying the charge stock with any suitable drying means known to the art such as a conventional solid adsorbent having a high selectivity for water, for instance, silica gel, activated alumina, calcium or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to dry the hydrogen stream entering the hydrocarbon conversion zone down to a level of about 5 volume p.p.m. of water or less. This can be conveniently accomplished by contacting the hydrogen stream with any suitable adsorbent such as the ones mentioned above. The preferred drying means is calcium aluminosilicate molecular sieves having a pore size of about 5 A.

Although the pressure utilized in the reforming zone can be selected from the range of about 50 to 1,000 p.s.i.g., the preferred pressure range is about 100 p.s.i.g. to about 600 p.s.i.g., and especially about 100 to 350 p.s.i.g. In fact, it is a singular advantage of the present invention that it allows stable operation at lower pressures than have heretofore been successfully utilized in continuous reforming systems. In other words, the present invention allows the operation of a continuous reforming system to be conducted at lower pressure (i.e. 100 to 350 p.s.i.g.) for about the same or better catalyst life before regeneration as has been heretofore realized with conventional catalysts at higher pressures (i.e. 400 to 600 p.s.i.g.). On the other hand, the stability feature of the present invention enables reforming operations conducted at pressures of 400 to 600 p.s.i.g. to achieve increased catalyst life before regeneration.

Similarly, the temperature required for reforming is generally lower than that required for a similar reforming operation using a high quality catalyst of the prior art. This significant and desirable feature of the present invention, is a consequence of the selectivity for the catalyst of the present invention for the previously characterized octane-upgrading reactions that are preferably induced in a typical reforming operation. Hence, the present invention requires a temperature in the range of from about 800° to about 1,100° F. and preferably about 900° to about 1,050° F. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant product, is substantially lower for the process of the present invention than for conventional continuous reforming processes, all other conditions being equal.

Likewise, sufficient hydrogen is charged to the reforming zone to provide an amount of about 2.0 to about 20 moles of hydrogen per mole of hydrocarbon entering the reforming zone with excellent results being obtained when about 7 to about 10 moles of hydrogen are used per mole of hydrocarbon. Moreover, the liquid hourly space velocity used is selected from the range of about 0.1 to about 10.0 hr.[-1] with a value in the range of about 0.5 to about 5.0 hr.[-1] being preferred.

The following examples are given to illustrate further the benefits that are derived from the present invention and the mode of operation thereof. It is understood that the examples are given for the sole purpose of illustration and are not to be considered to limit unduly the generally broad scope and spirit of the appended claims.

EXAMPLE I

An alumina carrier material consisting essentially of gamma alumina was prepared in the form of 1/16-inch spherical particles by the oil drop method which is described in U.S. Pat. No. 2,620,314. The resulting spherical alumina particles were then impregnated with a solution comprising chloroplatinic acid, hydrogen chloride, and perrhenic acid in amounts sufficient to yield a final catalyst containing 0.375 wt. percent platinum and 0.375 wt. percent rhenium, calculated on an elemental basis. The impregnated particles were then dried at a temperature of 230° F. for about 2 hours and thereafter oxidized with an airstream for a period of about 2 to 4 hours at a temperature of about 975° F. During the course of this oxidation step, an aqueous solution of hydrogen chloride was injected into the air stream, thereby adjusting the chlorine content of the catalyst.

The impregnated and oxidized particles were thereafter subjected to a dry prereduction step with substantially pure hydrogen at a temperature of about 1,050° F., a gas hourly space velocity of about 700 hrs.[-1] and a pressure slightly above atmospheric. This prereduction step was for a duration of about one hour.

A gaseous mixture of $H_2$ and $H_2S$ containing about 10 to 1 moles of $H_2$ to $H_2S$ was then utilized to affect the incorporation of about 0.10 wt. percent sulfur into the resulting prereduced catalyst particles. This sulfiding step was performed at exactly the same conditions as the prereduction step.

An analysis of the resulting catalyst showed it to contain, on an elemental bases, about 0.375 wt. percent platinum, about 0.375 wt. percent rhenium, about 0.85 wt. percent chloride and about 0.10 wt. percent sulfur. Furthermore, the atomic ratio of platinum metal to rhenium metal contained in the catalyst was approximately 1:1, and the total metals content was about 0.750. The resulting catalyst is hereinafter designated Catalyst A.

A series of tests were then made with different portions of Catalyst A in a laboratory scale reforming plant comprising a reactor containing a fixed bed of the catalyst particles, a hydrogen separator, a high surface area sodium drier, a debutanizer column, and other conventional equipment such as pumps, compressers, controllers, heating means, cooling means, etc., the details of which are well known to those skilled in the art.

The flow scheme utilized in this laboratory scale reforming plant is as follows: (1) the charge stock and hydrogen are commingled, heated to the conversion temperature, and passed into the reactor; (2) an effluent stream is withdrawn from the reactor, cooled to about 55° F., and passed into a hydrogen separator wherein a hydrogen-rich gas phase separates from a liquid hydrocarbon phase; (3) the hydrogen-rich gas phase is then withdrawn from the separator and a portion of it vented from the system as excess recycle gas in order to maintain pressure control, and another portion is passed through the high surface area sodium scrubber in order to remove essentially all $H_2S$ and $H_2O$ therefrom; (4) the resulting purified hydrogen stream withdrawn from the scrubber is then recompressed and recycled to the reactor; and, (5) the liquid phase from the separator is passed to the debutanizer column where light ends are taken overhead and $C_5$+ reformate recovered as bottoms.

The characteristics of the charge stock used in the series of tests are given in table I.

TABLE I—ANALYSIS OF HEAVY KUWAIT NAPHTHA

| | |
|---|---|
| API gravity, at 50° F. | 60.4 |
| Initial boiling point, °F. | 184 |
| 10% boiling point, °F. | 205 |
| 50% boiling point, °F. | 256 |
| 90% boiling point, °F. | 321 |
| End boiling point, °F. | 360 |
| Sulfur, wt. p.p.m. | 0.5 |

| | |
|---|---|
| Nitrogen, wt. p.p.m. | 0.1 |
| Aromatics, vol. % | 8 |
| Paraffins, vol. % | 71 |
| Naphthenes, vol. % | 21 |
| Water, p.p.m. | 5.9 |
| Octane No., F-1 clear | 40.0 |

A series of tests were then made with different portions of Catalyst A. These tests were all essentially conducted at the same conditions which were: a pressure of 100 p.s.i.g., a hydrogen to hydrocarbon mole ratio of 10:1, and a liquid hourly space velocity of 3.0. Furthermore, a target octane of 100 F-1 clear was selected, and the conversion temperature maintained in the reactor was continuously adjusted throughout each test in order to achieve and maintain this target octane.

Each test consisted of a line out period followed by six test periods of 24 hours. The principal parameter varied in these tests was sulfur level entering the reforming zone. The first test was run with essentially no sulfur entering the reforming zone in order to establish a basis for comparison. The other tests were run with the following amounts of sulfur continuously entering the reforming zone: 20 p.p.m., 100 p.p.m. 200 p.p.m., and 600 p.p.m. In these latter tests, the desired amount of sulfur was added to the charge stock in the form of tertiary butyl mercaptan. The results of this series of tests are shown in table II in terms of the temperature necessary to achieve 100 F-1 clear octane for each period, the $C_5+$ yield as a vol. percent of charge for each period, and the final carbon level on the catalyst after the test.

In sharp contrast, the results experienced with 20 p.p.m. sulfur in the feed are extremely beneficial in the areas of temperature stability, $C_5+$ yield stability, and decreased carbon make. For example, with no sulfur in the feed the temperature rise across the six periods necessary to maintain octane was 71° F. as compared to 35° F. for the 20 p.p.m. sulfur run. Similarly, the yield decline across the five periods for which it was measured for the no sulfur test is about 2.1 vol. percent which contrasts with the yield decline of 0.8 vol. percent that was experienced with 20 p.p.m. sulfur in the feed.

Therefore, in accordance with the present invention, the performance of a catalyst having an atomic ratio of platinum to rhenium of about 1:1 can be sharply improved by the continuous introduction of sulfur into the reforming zone if the amount of sulfur is continuously maintained in an amount less than 100 p.p.m., and, more preferably, about 20 p.p.m.

EXAMPLE II

Another catalyst is prepared in exactly the same manner as was described in Example I with the exception that the amounts of perrhenic acid and chloroplatinic acid used during the impregnation step are adjusted so that the resulting catalyst contains 0.1 wt. percent rhenium and 0.3 wt. percent platinum. This corresponds to a catalyst having an atomic ratio of platinum metal to rhenium metal of about 2.9 and a total metals content of about 0.4. The resulting catalyst designated as Catalyst B, was then subjected to a series of tests with the charge stock described in example I and in the labora-

TABLE II.—RESULTS OF ACCELERATED STABILITY TESTS FOR CATALYST A

| | No S | | 20 p.p.m. S | | 100 p.p.m. S | | 200 p.p.m. S | | 600 p.p.m. S | |
|---|---|---|---|---|---|---|---|---|---|---|
| | T. °F. | $C_5+$vol. percent | T. °F. | $C_5+$vol. percent | T. °F. | $C_5+$vol. percent | T. °F. | $C_5+$vol. percent | T. °F. | $C_5+$vol. percent |
| Period No.: | | | | | | | | | | |
| 1 | 1,002 | | 1,003 | | 1,006 | | 1,001 | | 1,005 | |
| 2 | 1,017 | 75.1 | 1,001 | 76.8 | 1,020 | 75.1 | 1,020 | 74.5 | 1,020 | 71.7 |
| 3 | 1,031 | 75.1 | 1,019 | 77.0 | 1,034 | 75.0 | 1,035 | 73.5 | 1,040 | 69.5 |
| 4 | 1,046 | 75.0 | 1,025 | 77.1 | 1,044 | 74.7 | 1,048 | 73.0 | 1,066 | 67.0 |
| 5 | 1,059 | 74.0 | 1,030 | 76.0 | | | 1,066 | 70.5 | | |
| 6 | 1,073 | 73.0 | 1,038 | 76.0 | | | 1,079 | 68.0 | | |
| Carbon level on catalyst, wt. percent | 7.97 | | 3.78 | | | | 6.25 | | 4.28 | |

From table II, it can be noted that this catalyst was extremely sensitive to very small amounts of sulfur. By comparing the results with 600 p.p.m. with those experienced with no sulfur added to the feed, it can be seen that both in the areas of temperature stability and yield stability, the presence of sulfur at this level was detrimental. The only beneficial effect observed with this much sulfur was a decrease in carbon level on the catalyst; it dropped from 7.97 wt. percent to 4.2 wt. percent.

The results experienced with 100 p.p.m. sulfur and 200 p.p.m. sulfur in the feed are generally slightly better than the results observed with 600 p.p.m. sulfur in the feed; however, they still indicated that this is too much sulfur for this catalyst at these conditions.

tory scale reforming plant described in example I. The tests were run at the same conditions as given in example I with the exception that a 300 p.s.i.g. pressure was used instead of 100 p.s.i.g. pressure. The result of these series of tests are given in table III.

TABLE III.—RESULTS OF ACCELERATED STABILITY TESTS FOR CATALYST B

| | No S | | 50 p.p.m. S | | 300 p.p.m. S | |
|---|---|---|---|---|---|---|
| | T. °F. | $C_5+$, vol. percent | T. °F. | $C_5+$, vol. percent | T. °F. | $C_5+$, vol. percent |
| Period No.: | | | | | | |
| 1 | 1,016 | | 1,010 | | 1,010 | |
| 2 | 1,025 | 70.2 | 1,015 | 69.8 | 1,014 | 67.5 |
| 3 | 1,030 | 69.0 | 1,019 | 69.5 | 1,016 | 67.0 |
| 4 | 1,034 | 67.5 | 1,022 | 68.9 | 1,019 | 66.5 |
| 5 | 1,038 | 67.7 | 1,024 | 68.4 | 1,021 | 65.5 |
| 6 | 1,042 | 68.0 | 1,027 | 68.0 | 1,025 | 65.0 |
| Carbon level on catalyst, wt. percent | 4.43 | | 2.20 | | 1.77 | |

From table III, it can be seen that for this catalyst a rather broad range of sulfur was beneficial. Specifically, the tests with both 50 p.p.m. sulfur and 300 p.p.m. sulfur in the feed demonstrated an increase in temperature stability and rate of carbon deposition relative to the test with no sulfur in the feed. On the other hand, the $C_5+$ yield decline for the 300 p.p.m. run was not as good as that experienced with 50 p.p.m. sulfur in the feed. These results then indicate that a sulfur level of about 50 p.p.m. sulfur in the feed is beneficial both in the areas of temperature stability and yield stability for a catalyst having an atomic ratio of platinum to rhenium of about 2.9 and having a relatively low total metal content of 0.4 wt. percent.

EXAMPLE III

Another catalyst is prepared by the method described in example I with the exception that the impregnation step is conducted with amounts of perrhenic acid and chloroplatinic acid sufficient to result in a final catalyst containing 0.2 wt. percent rhenium and 0.55 wt. percent platinum. This is equivalent to platinum ratio to rhenium metal of 2.6 and a total metals content of 0.75. The catalyst was designated as catalyst C.

A series of test were then made with different portions of this catalyst in exactly the same manner as described in example I. The results of this series of tests are given in table IV.

TABLE IV.—RESULTS OF ACCELERATED STABILITY TESTS FOR CATALYST C

|  | No S | | 100 p.p.m. S | | 200 p.p.m. S | |
| --- | --- | --- | --- | --- | --- | --- |
|  | T. °F. | $C_5+$, vol. percent | T. °F. | $C_5+$, vol. percent | T. °F. | $C_5+$, vol. percent |
| Period No.: | | | | | | |
| 1 | 1,017 |  | 1,011 |  | 1,010 |  |
| 2 | 1,035 | 77.0 | 1,029 | 76.3 | 1,022 | 78.5 |
| 3 | 1,049 | 75.6 | 1,043 | 76.2 | 1,032 | 77.0 |
| 4 | 1,064 | 74.5 | 1,055 | 76.0 | 1,043 | 75.3 |
| 5 | 1,086 | 70.0 | 1,070 | 73.2 | 1,054 | 74.0 |
| 6 | 1,108 | 65.0 | 1,088 | 70.5 | 1,070 | 73.0 |
| Carbon level on catalyst, wt. percent | 10.1 | |  | |  5.13 | |

From table IV, it can be seen that for this catalyst both 100 p.p.m. sulfur and 200 p.p.m. sulfur gave improved results relative to that experienced with no sulfur in the feed. This was true both in the area of temperature stability and yield stability. Accordingly, these results demonstrate that catalysts having a relatively high total metal content and a reasonably high atomic ratio of platinum metal to rhenium are much less sensitive to the presence of sulfur, and that, according to the present invention, sulfur may be used in a broader range to improve the performance of the reforming process using this kind of catalyst.

I claim as my invention:

1. In a process for reforming a gasoline fraction wherein a mixture of the gasoline fraction, hydrogen, and sulfur or a sulfur-containing compound, is continuously contacted, in a substantially water free reforming zone, with a reforming catalyst at conditions selected to produce a high octane reformate; wherein said reforming catalyst comprises a combination of a platinum group component, a rhenium component, a halogen component, and a sulfur component with an alumina carrier material, wherein the sulfur or sulfur-containing compound is introduced into the reforming zone both during startup and continuously thereafter; and wherein the platinum group component and the rhenium component are present in the catalyst in amounts sufficient to result in the final catalyst having an atomic ratio of platinum group metal to rhenium of at least about 2:1, and containing, on an elemental basis, about 0.1 to about 2.0 total wt. percent of the platinum group metal and the rhenium metal; the improvement which comprises selecting the amount of sulfur or sulfur-containing compound continuously entering the reforming zone as a function of the atomic ratio of the platinum group metal to the rhenium metal contained in the catalyst, the function being expressed by the following relationships wherein the amount of sulfur continuously entering the reforming zone throughout the reforming operation is calculated as an equivalent amount of weight p.p.m. of elemental sulfur in the gasoline fraction:

(1) for an atomic ratio of about 2:1 to about 4:1, an amount of sulfur of about 25 to about 1,000 p.p.m. and, (2) for an atomic ratio greater than about 4:1, and amount of sulfur of about 50 to about 3,000 p.p.m.

2. An improved process as defined in claim 1 wherein the platinum group component is platinum or a compound of platinum.

3. An improved process as defined in claim 1 wherein the halogen component is combined chlorine or fluorine.

4. An improved process as defined in claim 1 wherein said reforming catalyst contains, on an elemental basis, about 0.1 to about 1.5 wt. percent of the halogen and about 0.05 to about 0.50 wt. percent of sulfur.

5. An improved process as defined in claim 1 wherein said gasoline fraction is a naphtha boiling in the range of about $C_7$–$C_{11}$. fraction is a naphtha boiling in the range of about $C_7$–$C_{11}$.

6. An improved process as defined in claim 1 wherein said reforming conditions include a pressure of about 100 to about 350 p.s.i.g.

7. An improved process as defined in claim 1 wherein at least a portion of the sulfur-containing compound continuously introduced into the reforming zone is a mercaptan which is admixed with the gasoline fraction.

8. An improved process as defined in claim 1 wherein at least a portion of the sulfur-containing compound which is continuously introduced into the reforming zone is hydrogen sulfide which is admixed with the hydrogen.

9. An improved process as defined in claim 1 wherein said alumina carrier material is gamma or eta alumina.

10. An improved process as defined in claim 1 wherein the amount of water or water-yielding compounds entering said reforming zone is substantially less than an amount equivalent to 25 wt. p.p.m. of the gasoline fraction, calculated as water.